No. 782,968. PATENTED FEB. 21, 1905.
W. F. KRAMER.
AUTOMOBILE CANOPY.
APPLICATION FILED OCT. 14, 1904.
3 SHEETS—SHEET 1.
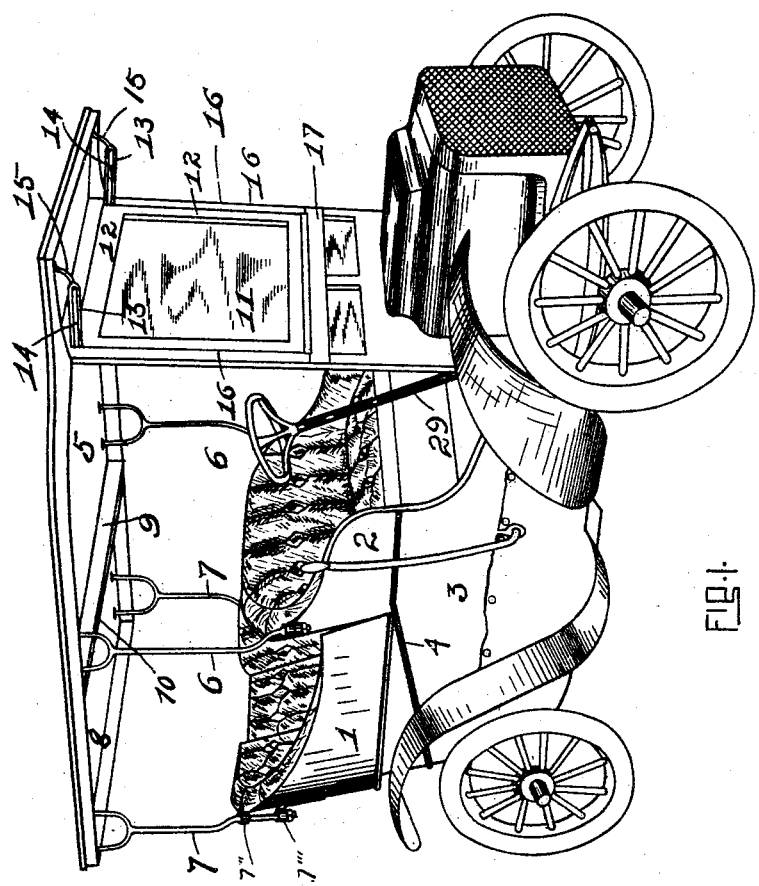

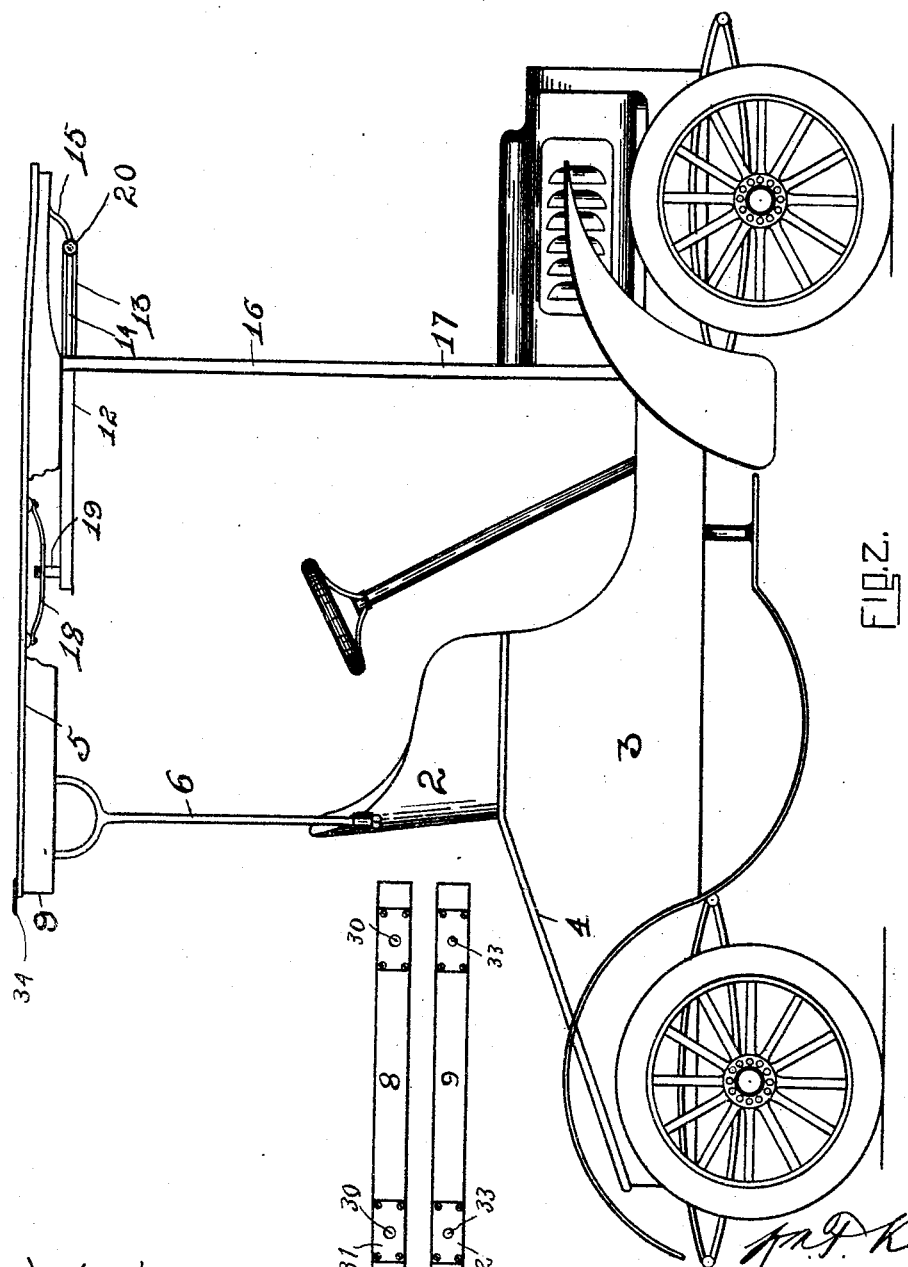

No. 782,968. PATENTED FEB. 21, 1905.
W. F. KRAMER.
AUTOMOBILE CANOPY.
APPLICATION FILED OCT. 14, 1904.
3 SHEETS—SHEET 3.
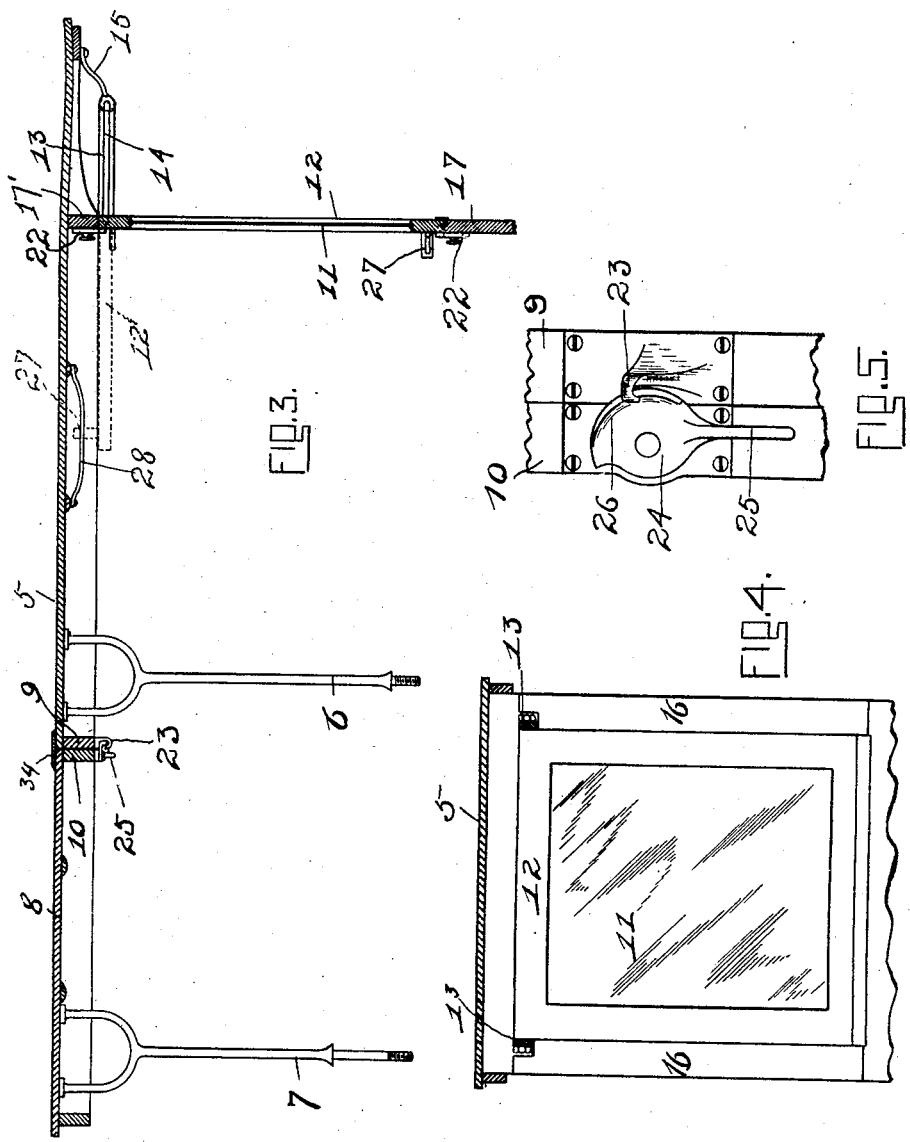
WITNESSES
Matthew Siebler
Cordy n. M. Theobald.
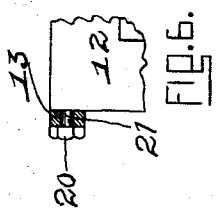
INVENTOR.
Wm. F. Kramer
By R. J. McCarty
his ATTORNEY No. 782,968.                                                                                      Patented February 21, 1905.

UNITED STATES PATENT OFFICE.

WILLIAM F. KRAMER, OF DAYTON, OHIO, ASSIGNOR TO THE WM. F. KRAMER CO., OF DAYTON, OHIO.

AUTOMOBILE-CANOPY.

SPECIFICATION forming part of Letters Patent No. 782,968, dated February 21, 1905.

Application filed October 14, 1904. Serial No. 228,398.

*To all whom it may concern:*

Be it known that I, WILLIAM F. KRAMER, a citizen of the United States, residing at Dayton, in the county of Montgomery and State of Ohio, have invented certain new and useful Improvements in Automobile-Canopies; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to improvements in canopy-tops for automobiles; and the improvements consist, first, in a front window which may be easily placed in and out of position to shield the occupants of the vehicle without inconveniencing said occupants and without removing such window from the vehicle; secondly, in a detachable tonneau with a separate canopy which joins the front canopy in a watertight connection and which is used to convert the vehicle into a two-seated vehicle with canopies above both seats.

The objects of the invention are, first, to provide a tonneau with a separate canopy which is a part thereof and which is supported on said tonneau when the latter is removed from the vehicle.

A further object of the invention is to provide a front window of unusual dimensions in this class of vehicles and which, owing to the manner of its mounting, has a storm-proof character which prevents the entrance of rain or wind.

Preceding a detail description of the invention reference is made to the accompanying drawings, of which—

Figure 1 is a perspective view of an automobile having my improvements thereon, the vehicle being converted into a two-seated vehicle. Fig. 2 is a side elevation showing the vehicle as a one-seated vehicle and showing the front window elevated out of an operative position. Fig. 3 is a longitudinal sectional view through the top and through the front window. Fig. 4 is a detached detail front view of the window. Fig. 5 is an enlarged view showing a means for connecting the front and rear canopies. Fig. 6 is an enlarged detail view of the connection on one side between the front window and one of its supporting-guides; Fig. 7, detail views embodying the flanges or walls of front and rear canopies, showing means for preventing sidewise movements of the rear canopy.

In a detail description of the invention similar reference characters indicate corresponding parts.

1 designates a tonneau or rear section which is detachable from the front section 2 and 3 of the vehicle proper, and when in position, as shown in Fig. 1, joins the rear diagonal edge 4, so that when said tonneau is in position or is not in position the symmetrical appearance of the vehicle proper is supported in the usual manner by posts 6, which fit in sockets on each side of the front seat 2 and are maintained therein in the usual manner. The rear of said front canopy terminates in a downwardly-projected wall or flange 9, extending throughout the width of said front canopy. The detachable tonneau 1 is provided with its own canopy, which is supported in the same manner upon posts 7. Each post is supported on the tonneau by two spaced sockets 7" and 7''', which are properly fastened to the tonneau, and said posts are held firmly in position by lock-nuts, which tighten against the lower sockets. It will thus be seen that the top or canopy-covering 8 of the tonneau is supported at all times upon the tonneau. The front edge of said canopy 8 terminates in a transverse flange 10, which matches with the flange 9 of the front canopy and is secured thereto by a suitable number of fastening devices of any desirable construction.

In Fig. 5 is shown a form consisting of a suitable number of hooks 23, which are secured to the lower edge of one of the flanges—for example, flange 9—and a corresponding number of eccentrics 24, which are securable to the other flange 10. These eccentrics 24 have handles 25, by which they are turned to cause the portion 26 thereof to engage or disengage the hooks 23. The tonneau-canopy is also secured to the front canopy against any lateral movement by a suitable number of pintles 30, which are fixed to plates 31 on the flange 10 of said canopy. Upon the adjacent flange 9 of the front canopy there is a corresponding number of plates 32, which have openings 33 to receive said pintles 30, and the canopy of the tonneau is thereby prevented from moving sidewise. The tonneau is attachable in any suitable manner which permits of its ready detachment or removal whenever the vehicle is to be used as a single-seated vehicle.

The roof-joint between the two canopies is protected by a water-shield 34, which projects over said joint and is secured to the forward canopy preferably.

Referring next to the feature of the front window, as a preliminary remark it may be stated that it is well recognized among users of this class of vehicles that in rapid driving a front window which does not obscure the vision of the chauffeur is highly desirable as a means for protecting the occupants from the swift currents of air, and it is also recognized that at times it is desirable to remove this window from before the occupants and at the same time have it in convenient position to be readily lowered or replaced at a moment's notice. In order to accomplish this, it is obviously necessary that the window should have a permanent attachment with the canopy or upper frame of the vehicle and that it should have such a connection which when not in use removes it entirely out of the way of the occupants of the vehicle without detaching it from the vehicle. To this end the sash 12, having the usual glass 11, is suspended or mounted upon two horizontal guides 13, of which there is one on each side of the canopy or top 5, supported upon a bracket 15, which is attached to the forward end of said canopy. These horizontal guides have intervening slots 14, which are closed at the rearward and forward ends and are adapted to receive pins 21, which project from the upper opposite edges of the window-sash 12 and are fitted with heads or nuts 20, which maintain said pins in sliding connection with the guides. When the window-sash is lowered to a perpendicular or operative position, as shown in Fig. 1, the pins 21 occupy the rearward terminals of the slots 14, and when said sash is elevated to its upper horizontal position, as shown in dotted lines in Fig. 3, the said pins occupy the forward ends of said slots. On the lower opposite edges of the sash 13 there are catches 27, which engage with keepers 28, secured against the inner side of the front canopy 5 and maintaining the window in its elevated position entirely out of the way. Any other form of fastening device for holding the window-sash up may of course be employed. 22 designates latches on the inner side of the lower transverse panel 17 of the vehicle-body and the upper transverse strip 17' below the front canopy, which serve to maintain the window locked at its top and bottom in the perpendicular position. Owing to the position of the steering rod or lever 29, which is necessarily in front of one of the occupants of the front seat, it is impossible to hang a desirably-large window on a hinge having a fixed position for the obvious reason that the steering lever or rod would not permit of an elevation of such window; but by supporting said window on the slotted guide-rods 13 the hinge or turning-point of said window is at the extreme outer end of said guides, in which position the window may be elevated free from any interference with the steering lever or rod, and, further, a larger window is obtainable than would otherwise be the case. By this manner and arrangement of hanging said window a perfect storm-proof window is obtained, which excludes the entrance of rain or wind to a very appreciable extent.

Having described my invention, I claim—

1. In a canopy for automobiles, a front canopy having a rear transverse marginal flange projecting downwardly, in combination with a detachable tonneau having a separate canopy with a front transverse marginal flange projecting downwardly and matching with the flange of the front canopy so as to provide a continuous canopy above the entire vehicle when the tonneau is in position, and means for uniting said canopies at the abutting flanges, substantially as set forth.

2. In a canopy or top for automobiles, a front canopy having a rear transverse marginal flange, in combination with a tonneau having a canopy of its own with the front end terminating in a transverse marginal flange matching the flange on the front canopy, a series of latches uniting said canopies at the flanges and preventing them from coming apart, and further means interposed between said flanges to prevent the tonneau-canopy from lateral movement independent of the front canopy, and a weather-strip overlapping the joint between the two canopies and preventing the entrance of rain below the canopy.

3. An automobile-canopy comprising two detachable sections, the rearward section being attached to a tonneau, means for connecting the two canopies along their adjacent transverse edges, a front window suspended upon horizontal guides secured to the forward end of the front canopy, said guides adapted to support the window upon their inner ends when said window occupies a perpendicular position, and to support said window at their forward ends when said window occupies a horizontal position, with means for supporting the lower end of said window when elevated to a horizontal position, substantially as set forth.

4. In a vehicle-canopy such as is described, a storm-window adapted to be placed in horizontal and perpendicular position, slotted guides secured in horizontal positions to the forward projecting portion of the canopy, pins projecting from the upper opposite sides of the window-sash and engaging the slots in said guides, whereby means are provided for enabling the window-sash to be elevated to an upper horizontal position when the pins occupy the forward terminals of said guides and to be lowered to a perpendicular position when said pins occupy the rearward terminals of said guides, and means on the lower portion of said window-sash adapted to engage a holding device located on the interior of the canopy, substantially as set forth.

In testimony whereof I affix my signature in presence of two witnesses.

WILLIAM F. KRAMER.

Witnesses:
R. J. McCarty,
C. M. Theobald.